UNITED STATES PATENT OFFICE.

CHARLES J. REED, OF PHILADELPHIA, PENNSYLVANIA, ASSIGNOR TO THE REED ELECTRIC COMPANY, OF SAME PLACE.

STORAGE-BATTERY.

SPECIFICATION forming part of Letters Patent No. 528,648, dated November 6, 1894.

Application filed June 8, 1894. Serial No. 513,947. (No model.)

*To all whom it may concern:*

Be it known that I, CHARLES J. REED, a citizen of the United States, residing at Philadelphia, in the county of Philadelphia and State of Pennsylvania, have invented a new and useful Improvement in Electrical Accumulators or Storage-Batteries, of which the following is a specification.

In storage batteries generally the transforming medium, sometimes called the electrolyte, is a salt of lead, copper, zinc, iron or mercury or some combination or mixture of these salts. In my improved form of accumulator I use a salt, preferably the sulphate, of cadmium. I find that as an electro-positive substance cadmium possesses many advantages over other metals. I use a solid conducting support of any suitable form as an electrode. The electrodes are immersed in a solution of cadmium sulphate, sulphuric acid and water. I prefer to use equivalent proportions of sulphuric acid and cadmium sulphate, viz., ninety-eight parts by weight of sulphuric acid, $H_2SO_4$, and two hundred and ten parts by weight of anhydrous cadmium sulphate, $CdSO_4$; but I do not limit myself to any particular proportions, as I have found that a mixture of variable proportions of sulphuric acid, water and cadmium sulphate may be employed.

For a positive electrode I prefer to use a lead support in contact with a mass of lead peroxide and lead sulphate formed by mixing red lead with sulphuric acid or by any other well known process.

For a negative electrode I use a sheet of carbon, lead, copper, cadmium, or any other suitable metal not easily dissolved by sulphuric acid.

The metal electrode may be amalgamated with mercury, but I find little if any advantage in this, as the cadmium seems to deposit equally well on any metal except aluminium whether it is amalgamated or not.

The accumulator, consisting of the two electrodes immersed in the solution of sulphuric acid and cadmium sulphate, is charged in the ordinary manner by passing an electric current through the solution from the positive to the negative electrode. The metallic cadmium is deposited in spongy form on the negative electrode and lead peroxide is produced at the positive electrode, while sulpluric acid is liberated in the solution.

In discharging the accumulator the metallic cadmium is dissolved by the sulphuric acid and passes into solution as cadmium sulphate, while the lead peroxide is partly converted into lead sulphate, as in all lead accumulators.

While I prefer the arrangement described above, I am not limited to any particular salt of cadmium nor to any particular form or material for the electrodes.

Having thus described my invention, what I claim, and desire to secure by Letters Patent of the United States, is—

1. An accumulator or storage battery having its electrodes immersed in a solution of sulphuric acid and cadmium sulphate substantially as described.

2. In an accumulator a solution of a cadmium salt in combination with two electrodes, the positive electrode containing a compound of lead.

In testimony whereof I have hereunto subscribed my name this 6th day of June, 1894.

CHARLES J. REED.

Witnesses:
EDWARD EVERITT,
WM. A. ROBBINS.